May 31, 1927.
C. M. STAINBROOK
VEHICLE SUNSHADE
Filed Aug. 25, 1926
1,631,074
2 Sheets-Sheet 1
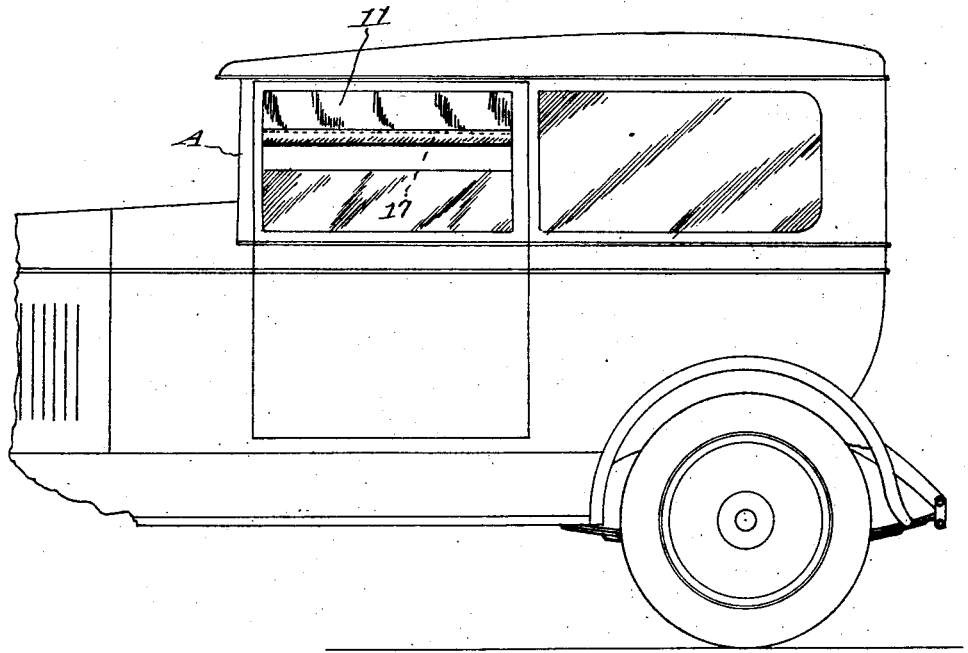
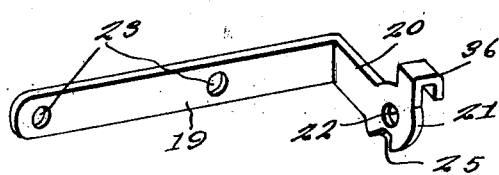
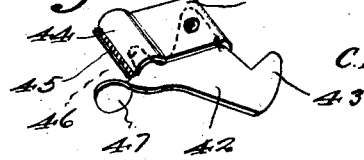
C. M. Stainbrook INVENTOR May 31, 1927.  
C. M. STAINBROOK  
VEHICLE SUNSHADE  
Filed Aug. 25, 1926  
1,631,074  
2 Sheets-Sheet 2
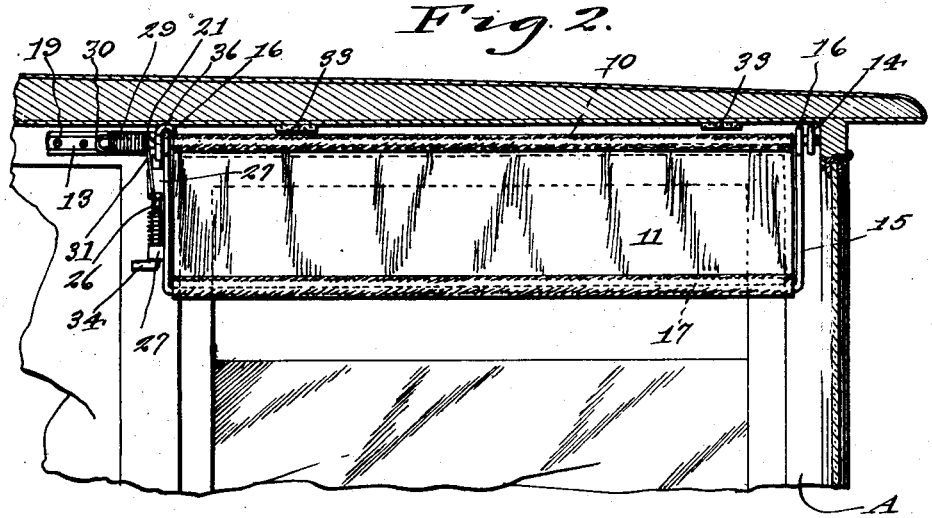
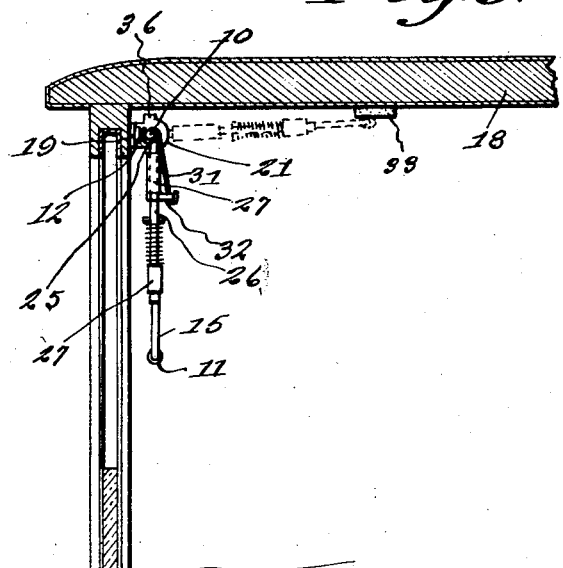
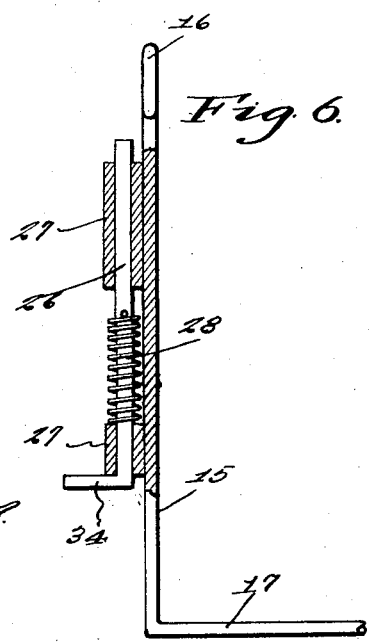
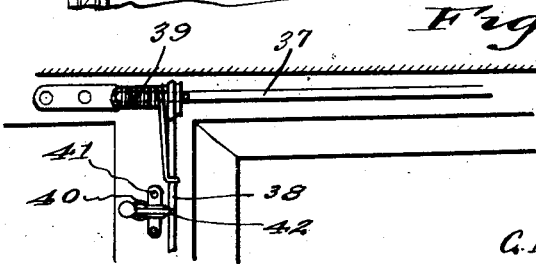
C. M. Stainbrook INVENTOR  
BY Victor J. Evans  
ATTORNEY
WITNESS:  
R. A. Thomas Patented May 31, 1927.

1,631,074

UNITED STATES PATENT OFFICE.

CHARLES M. STAINBROOK, OF BOWLING GREEN, KENTUCKY.

VEHICLE SUNSHADE.

Application filed August 25, 1926. Serial No. 131,516.

This invention comprehends the provision of a sun shade for motor operated vehicles, wherein use is made of a shade mounted to normally lie parallel with the top of the vehicle, and capable of being quickly and conveniently lowered to assume a vertical position immediately adjacent the window next to the driver, thereby protecting the driver from the sun.

In carrying out the invention I provide a novel construction of means for mounting the shade within the vehicle, so that it may occupy its position for use with the adjacent window of the vehicle either opened or closed, the shade being of a size to protect the driver from the sun, and at the same time allow him to see beneath the shade.

Another object of the invention resides in the provision of resilient means for normally holding the shade in and out of the way position parallel with the top of the vehicle, and means for holding the shade in position for use against the tension of the resilient means, the latter automatically returning the shade to its normal position when released from the second mentioned means.

In the drawings forming part of this application like numerals of reference indicate similar parts in the several views and wherein:

Figure 1 is a side elevation of a vehicle showing the position of the shade for use.

Figure 2 is a fragmentary sectional view through the vehicle showing the manner of mounting the shade.

Figure 3 is a fragmentary sectional view taken at a right angle to Figure 2, and showing the shade in both of its positions.

Figure 4 is a detail view of the supporting rod upon which the shade is mounted.

Figure 5 is a detail view of the keeper for holding the shade in lowered position.

Figure 6 is a fragmentary view of the shade frame and the latch element associated therewith.

Figure 7 is a fragmentary view of a slightly modified construction.

Figure 8 is a detail view of the latch shown in Figure 7.

The device forming the subject matter of the present invention comprises a rod 10 which is adapted to be arranged transversely across the window frame of a motor vehicle indicated generally at A, and upon which rod is supported the shade 11. The rod 10 is offset at one end as at 12 and secured to an attaching plate 13 which is adapted to be bolted or otherwise suitably secured to the vehicle body as shown in Figure 2, thereby spacing the rod 10 a slight distance from the window frame. This allows the shade 11 to be arranged within the vehicle in spaced relation to the window frame as shown in Figure 3, so that when the shade is lowered to active position it does not interfere with the raising and lowering of the adjacent window of the vehicle. The free end of the rod 10 is received by an eye bolt 14 to assist in supporting the rod in proper relation to the vehicle body.

The shade embodies a substantially U-shaped frame 15 terminating in eyes 16 which are mounted on the rod 10 to support the shade for swinging movement. The shade proper indicated at 11 is attached to the cross member 17 of the frame and is also looped about the rod 10, so that the shade is held taut under all conditions. As shown in Figure 3 the shade normally occupies a horizontal position directly beneath and parallel with the top 18 of the vehicle body, and when its use is desired, it is swung to a vertical position adjacent the window next to the driver, the shade being of a size to protect the face and upper part of the body of the driver from the heat of the sun, and at the same time permit the driver to see beneath the lower edge of the shade.

Any suitable means may be employed for holding the shade in either of its two positions, but I preferably employ a keeper including a substantially L-shaped arm as shown in Figure 5, the long branch 19 of which is bolted to the window casing, while the short branch 20 projects at a right angle from said casing and provided with an enlarged disk-like extremity 21 having a central opening 22 to receive the rod 10. The long branch 19 is provided with spaced openings 23, and the openings 24 in the attaching plate of the rod 10 are adapted to register with these openings to receive suitable fastening elements (not shown), which are employed to hold the keeper and rod attached to the vehicle body. The disk-like extremity 21 is provided with a notch 25 adapted to receive a latch 26 which is slidably mounted in suitable bearings 27 arranged on one side of the shade frame 15 as shown in Figure 6, said latch being surrounded by a coil spring 28 which is utilized to project the latch element in the direction of the disk-like extremity 21. Surrounding the rod 10 adjacent the attaching plate 13 thereof is a coil spring 29 which has one end fixed to the rod in any suitable manner as at 30 and its other end 31 attached to an apertured lug 32 projecting laterally from one of the bearings 27 for the latch element. This spring 29 normally holds the shade in a horizontal position beneath and parallel with the top 18 of the vehicle, during which time the latch element 26 engages the periphery of the disk-like portion 21. When in this position the shade bears against spaced yieldable disks 33 which maintain the shade spaced from the top of the vehicle to protect the latter from being injured or soiled. Now, when it is desred to use the shade it is only necessary to move the latter downwardly to a vertical position, parallel with the window as clearly shown in Figures 1, 2 and 3, and when the shade reaches this position the latch element 26 under the influence of the spring 28 will be projected within the notch 25 of the disk-like extremity 21 of the keeper. Thus the shade is held fixed with relation to the window casing in a position to protect the driver from the effects of the sun. The latch element is provided with a finger engaging portion 34 by means of which the element can be retracted from the notch 25, whereupon the spring 29 automatically returns the shade to its normal horizontal position. Carried by the disk-like extremity 21 is a curved extension 36 which overlies the adjacent eye 16 of the shade frame, and thereby guides the frame in its swinging movements, and prevents any endwise movement of the frame with relation to the rod 10.

In Figures 8 and 9 I have shown a slight modified form of the invention wherein the shade supporting rod is indicated at 37, the shade frame at 38 and the spring for normally holding the frame in a horizontal position at 39. All of these parts are constructed and arranged in the same manner as hereinabove described, this form of the invention differentiating from the preferred form in the means employed for holding the window shade lowered in a vertical position. In this connection I employ a small casing 40 which is adapted to be secured to the window casing as at 41, the casing supporting a pivoted dog 42 having a hook-like extremity 43 adapted to engage the adjacent side of the shade frame 38 for holding the latter in its lowered active position. The casing 40 is formed with a substantially cylindrical-like portion 44 to receive a spring 45 and a lug 46 carried by the dog, and engaging said spring whereby the dog is normally held in its active position. Consequently when the frame is moved downwardly it rides over the dog 42, slightly depressing the latter, the dog subsequently assuming a position to engage the frame 38 for the purpose stated. The dog is provided with a thumb engaging portion 47 by means of which the frame can be conveniently released, and allowed to assume its normal position under the influence of the spring 39.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In combination, a horizontally disposed rod having an offset attaching portion adapted to be secured to a support, a shade frame mounted on said rod for pivotal movement, resilient means associated with the rod and frame and normally holding the latter in a horizontal plane, a bracket secured to the attaching portion of said rod and including an offset disk like extremity having a notch, and a spring pressed bolt carried by the frame and arranged to move about the periphery of said disk, and adapted to be received by said notch to hold the shade and its frame in a vertical position.

2. In combination, a horizontally disposed rod having an offset attaching portion adapted to be secured to a support, a substantially L-shaped bracket having one branch secured to the attaching portion of the rod, a disk formed on the other branch and having an opening to receive said rod, and also provided with a peripheral notch, a shade frame pivoted on said rod, yieldable means for normally holding the frame in a horizontal plane, and a spring pressed bolt carried by said frame and adapted to automatically engage said notch when the frame is swung downwardly, and hold the frame in a vertical position.

CHAS. M. STAINBROOK.